US009836831B1

(12) United States Patent
Krishnaswamy et al.

(10) Patent No.: US 9,836,831 B1
(45) Date of Patent: Dec. 5, 2017

(54) SIMULATING LONG-EXPOSURE IMAGES

(71) Applicant: Google Inc., Mountain View, CA (US)

(72) Inventors: Aravind Krishnaswamy, San Jose, CA (US); Matthew Steiner, Los Altos, CA (US)

(73) Assignee: Google Inc., Mountain View, CA (US)

( * ) Notice: Subject to any disclaimer, the term of this patent is extended or adjusted under 35 U.S.C. 154(b) by 233 days.

(21) Appl. No.: 14/453,896

(22) Filed: Aug. 7, 2014

Related U.S. Application Data

(60) Provisional application No. 62/031,095, filed on Jul. 30, 2014.

(51) Int. Cl.
 G06T 5/50 (2006.01)
 G06T 7/20 (2017.01)
 G06T 5/20 (2006.01)
 G06T 7/00 (2017.01)

(52) U.S. Cl.
 CPC .............. G06T 5/20 (2013.01); G06T 7/0081 (2013.01); G06T 5/50 (2013.01); G06T 7/20 (2013.01)

(58) Field of Classification Search
 CPC .. G06T 7/2006; H04N 5/145; H04N 5/23254; H04N 5/23264
 USPC ............... 348/208.1, 699; 382/103, 282, 284
 See application file for complete search history.

(56) References Cited

U.S. PATENT DOCUMENTS

| | | | |
|---|---|---|---|
| 5,557,341 A * | 9/1996 | Weiss .................... | G06T 7/2026 348/699 |
| 6,522,785 B1 * | 2/2003 | Kondo ................... | G06T 7/231 348/402.1 |
| 7,092,016 B2 | 8/2006 | Morton et al. | |
| 7,408,987 B1 * | 8/2008 | Chevance .............. | H04N 19/51 348/699 |
| 7,702,131 B2 | 4/2010 | Chinen et al. | |
| 8,228,400 B2 | 7/2012 | Liu et al. | |
| 8,630,454 B1 | 1/2014 | Wang et al. | |
| 9,094,606 B2 * | 7/2015 | Streeter .................. | G01S 17/36 |
| 9,247,129 B1 * | 1/2016 | Gray .................. | H04N 5/23222 |
| 2001/0017890 A1 | 8/2001 | Rhee ...................... | H04N 7/014 375/240.16 |
| 2004/0257444 A1 * | 12/2004 | Maruya ............ | G08B 13/19645 348/169 |
| 2005/0265452 A1 * | 12/2005 | Miao .................... | H04N 19/105 375/240.16 |
| 2005/0275727 A1 * | 12/2005 | Lai ...................... | H04N 5/23248 348/208.1 |
| 2007/0092122 A1 * | 4/2007 | Xiao ...................... | H04N 19/61 382/128 |

(Continued)

OTHER PUBLICATIONS

Boykov et al. ("Interactive graph cuts for optimal boundary & region segmentation of objects in N-D images," International Conference on Computer Vision, vol. 1, Jul. 2001).*

(Continued)

Primary Examiner — Yubin Hung
(74) Attorney, Agent, or Firm — IP Spring

(57) ABSTRACT

Implementations relate to simulating long-exposure images. In some implementations, a method includes examining a series of images, determining an optical flow of pixel features between the image and an adjacent image in the series of images, and blurring one or more regions in one or more of the images, where the one or more regions are spatially defined based on one or more attributes of the optical flow.

20 Claims, 6 Drawing Sheets

(56) References Cited

U.S. PATENT DOCUMENTS

| | | | |
|---|---|---|---|
| 2007/0290886 A1* | 12/2007 | Stam | B60Q 9/00 340/907 |
| 2008/0226193 A1* | 9/2008 | Mishima | G06T 7/238 382/278 |
| 2009/0052532 A1 | 2/2009 | Robinson | |
| 2009/0079836 A1* | 3/2009 | Mishima | G06T 3/4007 348/208.4 |
| 2009/0208062 A1* | 8/2009 | Sorek | H04N 5/232 382/107 |
| 2010/0124361 A1* | 5/2010 | Gaddy | G06T 7/207 382/107 |
| 2010/0225790 A1* | 9/2010 | Sasaki | G06T 5/50 348/241 |
| 2010/0303374 A1* | 12/2010 | Mizuno | G06T 3/4053 382/260 |
| 2011/0128379 A1* | 6/2011 | Lee | G06K 9/00805 348/144 |
| 2011/0129166 A1* | 6/2011 | Nishiyama | G06T 5/003 382/263 |
| 2011/0279641 A1* | 11/2011 | Wang | G06T 3/0093 348/42 |
| 2012/0057748 A1* | 3/2012 | Katano | G06T 7/204 382/103 |
| 2012/0242851 A1* | 9/2012 | Fintel | H04N 5/23222 348/221.1 |
| 2013/0034339 A1* | 2/2013 | Mizuno | G06T 3/4053 386/263 |
| 2013/0070121 A1* | 3/2013 | Gu | H04N 5/2329 348/239 |
| 2014/0334715 A1* | 11/2014 | Wen | G06T 19/20 382/154 |

OTHER PUBLICATIONS

Geusebroek et al. ("Fast Anisotropic Gauss Filtering," IEEE Trans. Image Processing, vol. 12, No. 8, Aug. 2003).*

Xiao et al. (Bilateral Filtering-Based Optical Flow Estimation with Occlusion Detection, European Conference on Computer Vision, 2006).*

* cited by examiner

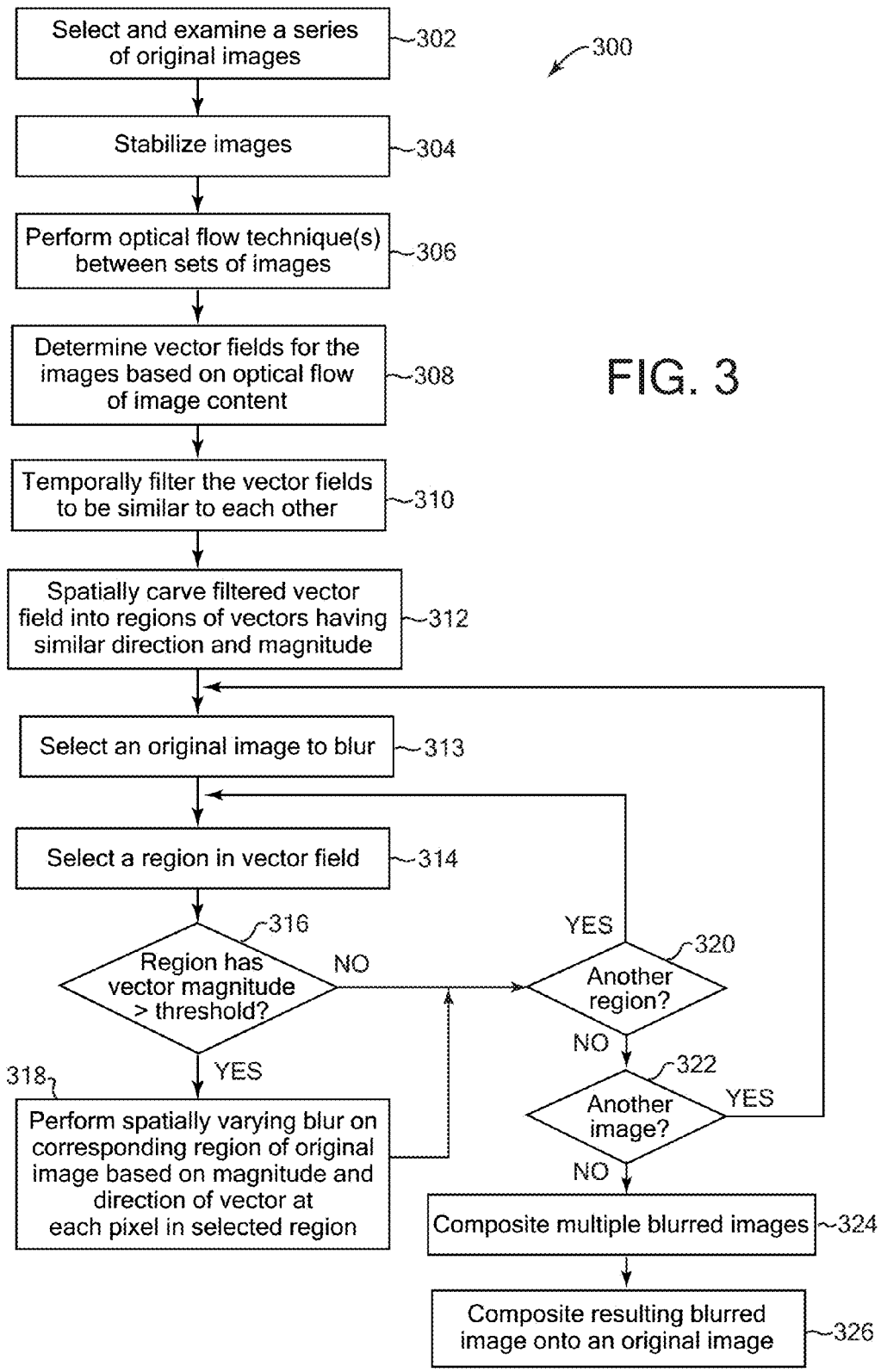

SIMULATING LONG-EXPOSURE IMAGES

CROSS-REFERENCE TO RELATED APPLICATIONS

This application claims priority to U.S. Provisional Application No. 62/031,095, filed Jul. 30, 2014, and which is incorporated herein by reference in its entirety.

BACKGROUND

The popularity and convenience of digital cameras as well as the widespread of use of Internet communications have caused digital images to become ubiquitous. For example, user-produced digital photographs are posted to various Internet sites, such as web pages, social networking services, etc. for users and others to view. One type of image effect that may be desirable is a long exposure effect, in which stationary elements in a scene remain crisp and unblurred and moving elements in the scene are blurred in the resulting image. For example, moving water or clouds can have a blurred effect while surrounding landscape elements are shown having clarity. Such images may typically be obtained by setting a camera in a stable and stationary position with a long exposure time or shutter-speed to capture a scene.

SUMMARY

Implementations of the present application relate to simulating long-exposure images. In some implementations, a method includes examining a series of images, determining an optical flow of pixel features between the image and an adjacent image in the series of images, and blurring one or more regions in one or more of the images, where the one or more regions are spatially defined based on one or more attributes of the optical flow.

Various implementations and examples of the method are described. For example, the method can further include stabilizing the content depicted in the images to align pixel features among the series of images and remove undesired camera motion occurring over the series of images. Determining the optical flow can include determining one or more vector fields for a plurality of the images indicating the optical flow of one or more image content features between the image in which the vector field is located and an adjacent image in the series of images. For example, the one or more vector fields can each include a plurality of vectors, each vector located in correspondence with an associated pixel, where each vector indicates the direction and magnitude of the optical flow of the associated pixel occurring between the image in which the vector is located and the adjacent image. In some implementations, the vector fields can include a plurality of vectors, where each vector is located in correspondence with a group of multiple pixels.

The method can further comprise filtering the vector fields of the series of images to remove high-frequency differences between the corresponding vectors of different images and to cause one or more vector fields in different images to be more similar to each other, and the regions can be spatially defined based on one or more filtered vector fields resulting from the filtering. The regions can be spatially defined by grouping vectors having a similar direction and magnitude. For example, the regions can be determined using a graph cut technique. The blurring of one or more regions can include blurring the regions that have vectors with a magnitude of optical flow higher than a predetermined threshold. For example, the blurring can be a spatially-varying blur using a kernel having a kernel size and kernel value distribution based on the magnitude and direction of the vectors of the one or more regions. The method can further include compositing the one or more blurred regions onto at least one image of the series of images to create an image having the blurred regions. In some implementations, the blurring one or more regions includes creating a blurred image and the compositing includes compositing the blurred image with at least one of the images to create an image having the blurred regions.

In some implementations, an application on a client device automatically captures the series of frames and provides the series of frames to at least one processor at the client device or a connected remote server device to perform the determining the optical flow and blurring the one or more regions. In some implementations, an application on a client device automatically analyzes images in real time as they are captured by the client device to determine whether the images have a suitable movement for performing the determining the optical flow and blurring the one or more regions.

A method includes, in some implementations, examining a series of images, and determining one or more vector fields in each of the images indicating an optical flow of pixel features between the image in which the vector field is located and an adjacent image in the series of images. The method blurs one or more regions in one or more of the images, where the one or more regions are spatially defined based on one or more attributes of the vector fields. The method composites the blurred regions onto at least one of the images in the series of images. The vector fields can each include a plurality of vectors at a plurality of corresponding locations in the images, each vector indicating an optical flow of one or more corresponding pixels of one of the images in which the vector is located to an adjacent image in the series of images, and the regions can be spatially defined based on a magnitude of the vectors in the vector fields.

In some implementations, a system can include a storage device and at least one processor accessing the storage device and operative to perform operations. The operations include examining a series of images and determining an optical flow of pixel features between the image and an adjacent image in the series of images. The operations include blurring one or more regions in one or more of the images, where the one or more regions are spatially defined based on one or more attributes of the optical flow. The operation of determining the optical flow can include determining one or more vector fields for at least a plurality of the images indicating the optical flow of one or more image content features between the image in which the vector field is located and an adjacent image in the series of images. The one or more vector fields can each include a plurality of vectors, each vector located in correspondence with an associated pixel, where each vector indicates the direction and magnitude of the optical flow of the associated pixel occurring between the image in which the vector is located and the adjacent image. The operation of blurring can include blurring the one or more regions that have a magnitude of optical flow higher than a predetermined threshold.

BRIEF DESCRIPTION OF THE DRAWINGS

FIG. 3 is a flow diagram illustrating another example method for simulating long-exposure images, according to some implementations;

DETAILED DESCRIPTION

Figure 1:
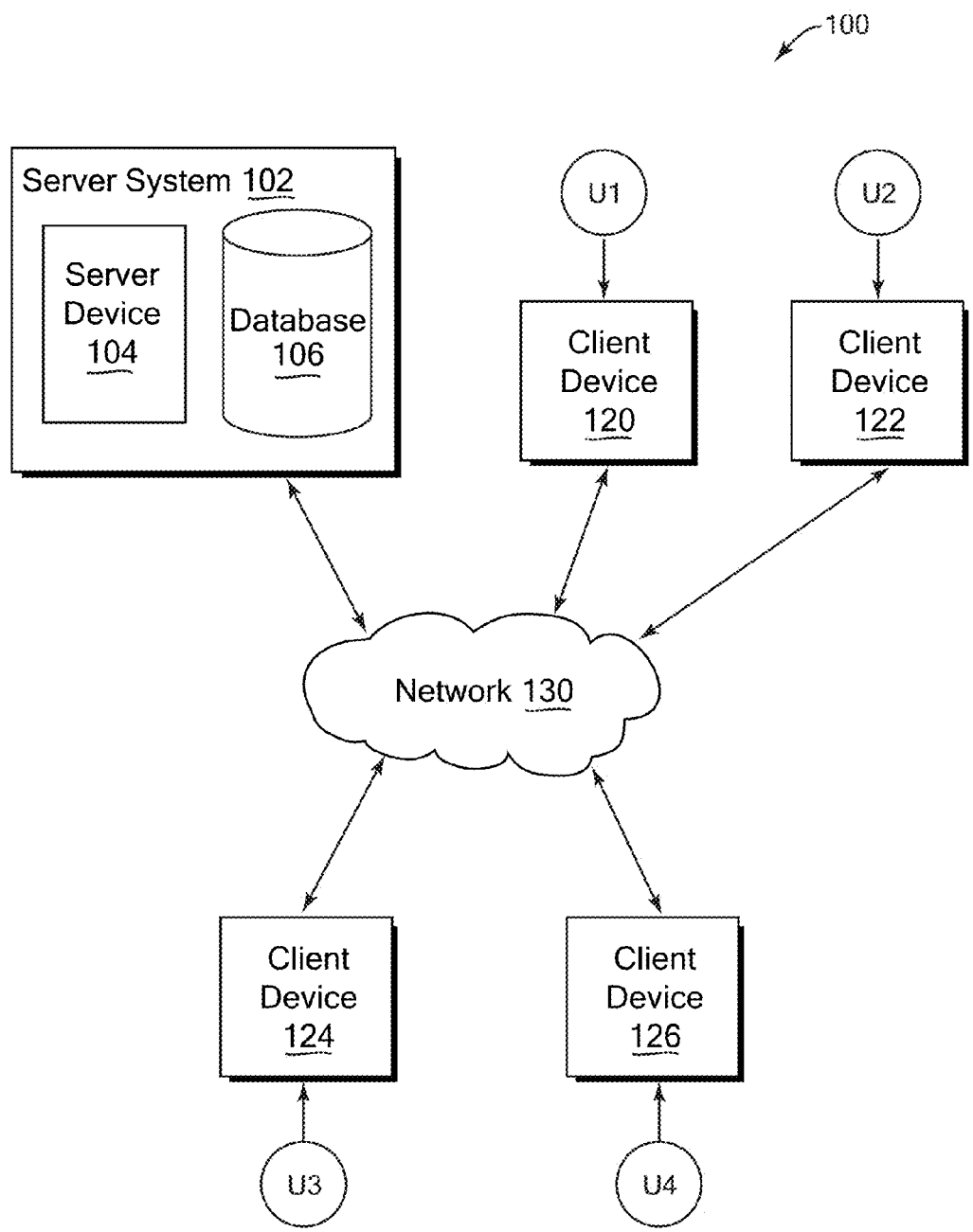
FIG. 1 is a block diagram of an example network environment which may be used for one or more implementations described herein.

One or more implementations described herein relate to simulating long-exposure images. For example, a system can examine a series of images, determine an optical flow of pixel features between the image and an adjacent image in the series of images, and blur one or more regions in one or more of the images, where the regions are spatially defined based on one or more attributes of the optical flow. The blurred regions can be composited on one of the original images. Such features can create an effect simulating a long exposure in an output image that depicts a scene similar to the scenes of the original images.

These and other described features can allow long-exposure images to automatically be created from multiple original images. Created long-exposure images provide an excellent approximation of a long-exposure effect without the user having to create the effect in the typical ways. For example, to capture such an image, the user would previously be required to set a camera on a tripod or other stable support to achieve camera stability, and would have to set a long exposure setting or shutter speed to capture a scene over a longer period of time. The user may also have to use a special filter on the camera, e.g., in a daylight or other strong lighting situations, to prevent too much light from entering the lens during the long exposure. In other scenarios, the user could try to approximate the long-exposure effect with image processing by manually combining a series of images, e.g., by averaging them, to create an effect that is typically not a good approximation of a long-exposure effect.

In contrast, using features described herein, the user need only capture a series of images at short exposures or fast shutter speeds, and described features can automatically (e.g., without user intervention) process the images to provide a simulated long-exposure image. In addition, in some implementations, the user need not specify the particular time interval over which the long-exposure image is to simulate its exposure. For example, the user can designate a particular series of images having an arbitrary overall time interval from first image to last image. In addition, some implementations can automatically capture additional needed images depicting a scene, without the user having to manually do so. Some implementations can also provide features that automatically detect and use images captured for other purposes (such as a "burst" of photos to show progression) to create long-exposure images of the depicted scenes. A user can also manually designate a particular set of images to be used to create simulated long-exposure images. Thus, a technical effect of creating images as disclosed herein include a reduction in duration of user capture and/or editing of images, thus saving a user time, energy, and resources for obtaining long-exposure images. Another technical effect is a higher quality of long-exposure images resulting from realistic blurring effects that can take into account detected motion of image content over a series of images.

In some examples, a system obtains a series of images, such as several images of the same scene taken over a short period of time. For example, a client device such as a phone or camera can automatically capture a series of images for a scene, and/or can advise the user to do so. Or, a user can also manually select the series of images. The system can stabilize the images relative to each other, e.g., use a content-aware stabilizer to warp the image pixels and approximately align image features among the images. The system can then determine an optical flow of image features, e.g., movement of groups of pixels having a particular color, where this flow can be measured between each image and an adjacent image in the series of images. For example, the system can determine a vector field in each image, where the vector field includes a vector at each pixel (or at each group of pixels). Each vector indicates a direction of movement of its pixel with respect to the adjacent image, and also indicates a magnitude of that movement.

The system can temporally filter (e.g., obtain the average or mean of) the vector fields across the series of images to remove high-frequency differences between the vector fields of the images. The system then carves out regions in a filtered vector field based on vector directions and magnitudes in the vector field. For example, groups of vectors that have similar magnitudes and directions are collected together in each respective region. In some examples, the regions can be determined using graph cut optimization. The system then blurs regions in an original image corresponding to particular regions in the filtered vector field. For example, image regions that correspond to field regions having vectors with a high magnitude (over a threshold) are blurred. In some implementations, the blur is a spatially-varying blur, where the radii and amount of the blur (e.g., the size and weights of the blur kernel) at each pixel location in the region are varied based on the direction and magnitude of the vector at that pixel location. In some implementations, the blurred image is then composited onto one of the original images to blend features of the blurred and original images.

Thus, pixel features that move between images at a high enough rate can be blurred by an amount based on their rate of movement and in a direction based on their direction of movement, allowing realistic blur for features moving at different rates in the direction of motion. Non-moving or very slow-moving pixel features need not be blurred. This provides an accurate simulation that the image was captured with long exposure settings that caused certain moving features to be blurred.

An "image" as referred to herein can be a still image, single image, or standalone image, or can be an image extracted from a sequence of images, e.g., a frame in a video sequence of video frames. For example, implementations described herein can be used with single images or with one or more images from one or more video sequences of images. "Compositing" herein refers generally to any type of combining of images or image portions, including blending (e.g., alpha blending), alpha compositing, feathering, digital compositing, etc.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, wearable devices (e.g., display glasses or goggles, wristwatch, etc.), personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, the social network service can include any system allowing users to perform a variety of communications, form links and associations, upload and post shared content including text, images, video sequences, audio sequences or recordings, or other types of content for access by designated sets of users of the social network service, and/or perform other socially-related functions.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
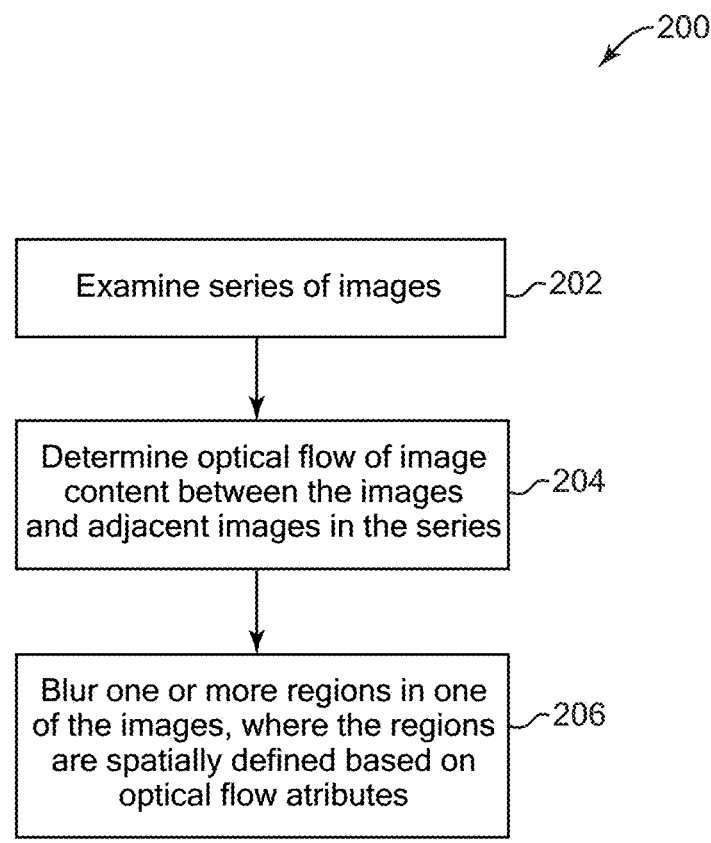
FIG. 2 is a flow diagram illustrating an example method for simulating long-exposure images, according to some implementations.

FIG. 2 is a flow diagram illustrating one example of a method 200 for simulating long-exposure images. In some implementations, method 200 can be implemented, for example, on a server system 102 as shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200.

Method 200 can be implemented by computer program instructions or code, which can be executed on a computer, e.g., implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software.

In some implementations, method 200, or portions of the method, can be initiated based on user input. A user may, for example, have selected the initiation of the method 200 from an interface such as an application interface, a social networking interface, or other interface. In other implementations, the method 200 can be initiated automatically by a system. For example, the method 200 (or portions thereof) can be periodically performed, or performed based on one or more particular events or conditions such as a user opening an application such as an editing application, receiving a suitable set of images that have been newly uploaded to or accessible by the system, etc. In some implementations, such conditions can be specified by a user in custom preferences of the user. In some implementations, the method 200 or portions thereof can be performed with guidance by the user. For example, a user can designate a set of multiple input images to be input and processed by method 200. In one non-limiting example, method 200 (or portions thereof) can be performed on a camera, cell phone, or other client device that has captured one or more images. In addition or alternatively, a client device can send images to a server over a network, and the server can process the images using method 200, or the server can receive images from a different source (a different server, etc.).

In block 202, the method examines a series of images. The images can each be a digital image composed of multiple pixels, for example, and can be stored on one or more storage devices of the system or otherwise accessible to the system, such as a connected storage device, e.g., a local storage device or storage device connected over a network. For example, the images can be photos captured by a camera, image frames extracted from a captured video stream or other video data, or images derived from a different source. In some implementations, a user can provide or designate one or more input images to process. In other implementations, the images can be automatically selected by the method, e.g., as images from an album or other collection of multiple images, such as an album provided in an account of a user of a social networking service or other networked service. In some examples, the system can determine which images to obtain based on evaluating one or more characteristics of accessible images, e.g., evaluating the images for similarities of characteristics, e.g., color distributions in the images, timestamps and other metadata of images, and/or identified and recognized content depicted in the images, such as persons, faces, or other objects.

In block 204, the method determines optical flow of pixel features between the images and adjacent images in the series. Optical flow is the pattern of apparent motion of objects or other features in a scene (e.g., features such as pixels, groups of pixels, textures or patterns, depicted water, clouds, or other moving surfaces, etc.), and optical flow techniques can track the motion of image objects or other features in a series of frames. In this example application, one or more optical flow techniques can be used to determine the movement of pixels of the image from one image to an adjacent image, e.g., tracking particular pixel colors or features as they move from pixel positions in a first image of the series to second, different pixel positions in the next image of the series. The optical flow techniques can be used in some implementations to track the motion of each pixel, e.g., each pixel color or feature, of the image. In other implementations, the motion of larger features having multiple pixels can be tracked, and the motion of groups of pixels can be determined. For example, larger features can be determined by grouping pixels having similar colors and/or other attributes (brightness, etc.), and the movement of groups of pixels can be tracked. Some implementations can determine vectors based on the optical flow, as described in greater detail below with respect to FIG. 3.

In block 206, the method blurs one or more regions in at least one of the images, where the regions are spatially defined based on one or more attributes of the optical flow determined in block 204. For example, the method can determine regions in one of the images based on the amount (magnitude) and direction of movement of the pixels as detected using the optical flow techniques. Pixels having similar amounts and directions of movement can be grouped into a region such that multiple regions can be formed, each region having pixels with similar motion. The method can blur the particular regions that meet predetermined criteria, such as regions having a minimum amount of pixel movement. For example, the blurring can use convolution to average pixel colors in a defined area. Such features are described in greater detail below with respect to FIG. 4.

The blurred regions are regions of a resulting image of the scene depicted in the series of images, where the blurred regions exhibited enough motion between the series of images to be blurred as if the image were captured using a long exposure. This allows the method to simulate a long-exposure image without having to use the typical methods of capturing an image over a longer exposure period or combining images manually. In addition, features such as blurring only particular regions of the image allows images captured over a variety of different timespans to be used as the input series of images.

FIG. 3 is a flow diagram illustrating another example of a method 300 for simulating long-exposure images. Method 300 can be implemented by a system that is or includes, for example, a server and/or client device as described above for method 200.

In block 302, the method selects or obtains a series or sequence of original images, e.g., similarly as described above for block 202 of FIG. 2. In some implementations, the method selects at least a minimum number of images which has been determined to create a satisfactory long-exposure approximate effect using method 300. For example, a minimum of five images can be selected in some implementations, or a minimum of three images, eight images, etc. The series of images can be provided to the method 300 or the method 300 can find and select the images in a variety of implementations.

For example, in some implementations the method 300 can be performed on a client device such as a cell phone, camera device, tablet device, wearable device, etc., where the client device includes a camera having image capturing capability. The series of original images can be images captured by the camera of the client device. In some implementations, the camera can include a "burst" mode or similar function, where the user selects this mode to cause the camera to capture a number of images in rapid succession, e.g., in response to the user selecting a shutter button or other control of the client device. These captured images, or a subset of these images, can be selected for block 302, e.g., either provided to the method 300 or the method 300 finds and selects the images in accessible storage. For example, some implementations can select images that have a maximum and/or minimum time interval between adjacent (e.g., successive) images. Some implementations can select a series of images that have a maximum or minimum time interval between the first image in the series and the last image in the series. For example, the method can determine the time intervals between images based on timestamp metadata associated with each image that indicates the time of capture of that image.

In some implementations, the client device can provide options to a user whether to capture successive images. For example, if the user is using the camera to capture an image of a scene, block 302 can detect and monitor objects or other features in the scene over a predetermined time period and determine whether the objects or other features are moving within the scene. If so, the block 302 can automatically (e.g., without user intervention) capture additional images of the scene to capture the motion in addition to any images captured based on user commands. The block 302 can stop capturing images after a predetermined condition occurs, e.g., a predetermined time has elapsed, a predetermined number of images have been captured, and/or the tracked objects or other features have moved out of the scene. In some implementations, the client device can prompt the user if he or she wants a simulated long-exposure image for the scene, and if the user assents then the captured images can be provided to the method 300 (e.g., the images are selected in block 302) for processing. If the user does not want a long-exposure image, then the additional images captured by the camera can be discarded. In some implementations, instead of automatically capturing the additional images, the method can prompt the user if he or she wants the simulated long-exposure image, and only captures the additional images if the user assents.

In some implementations, the block 302 (or other method in communication with method 300) can evaluate a number of images that are accessible to the method 300. For example, images stored in storage accessible to the method 300, e.g., one or more albums of the user or other users, can be evaluated to determine whether one or more long-exposure images can be created from the images. In some examples, the method can check timestamps of images to determine time of image capture/creation, and check whether images have similar content and are captured within a maximum time interval of each other. For example, if the minimum required number of images are found with a maximum required time interval between adjacent images, then these images can be selected for processing in block 302. Some implementations can select a subset of a series of images to meet particular requirements of the series of images for method 300.

Some implementations can provide the processing of method 300 (or method 200) without requirements that there be a particular time interval, minimum time interval between adjacent images, and/or maximum time interval between the first image and the last image in the series of images. For example, the long-exposure effect can advantageously be provided over any time interval of images. Some implementations may require particular maximum (or minimum) time intervals between adjacent images in the series of images but not overall time intervals between first and last images.

In some implementations, block 302 can receive a selection of the images from another source. For example, a user can manually select the images that he or she wishes to be processed by method 300. In some examples, the user can use an interface of an image editing program or other application program to select desired images to be processed, where the interface is displayed on a client device, server device, etc. In some implementations, the method can check the user-selected images to determine whether the images satisfy minimum requirements to be processed, e.g., a minimum and/or maximum time interval between adjacent images, overall time interval, etc. In some implementations, users can also manually select or adjust the regions and/or other processing features used in method 300 as described below.

In some implementations, after the series of images are selected, a user can be prompted for information that can affect the processing of the original images in the blocks of method 300 described below. For example, a user can select or change parameters involved in the processing described in method 300, such as minimum number of images, various thresholds, etc.

In block 304, the method stabilizes the series of images. This block can include the use of image stabilization techniques that cause undesired movement of the camera that is capturing the images to be reduced and to align the content of the images closely to each other. For example, the stabilization can reduce jittery motion or other kinds of undesired motion that is exhibited over the series of images, e.g., caused by a user holding the camera during image capture or other movement when capturing the images, etc. For example, the content in one or more of the images may be offset relative to the content in other images due to camera motion, and this offset is removed or reduced. In some implementations, the content in the images can be aligned to a particular one of the images that is designated as a reference image.

Any of a variety of image stabilization techniques can be used. For example, a content-aware stabilizer can be used to remove motion jitter that may have occurred between images due to camera motion. The content-aware stabilizer can look at the content variation in each image over one or more axes of the image by tracking pixel colors or features across the images. The stabilizer can warp one or more of the images so that all of the images' content is approximately aligned. For example, the stabilizer can warp one or more of the images in three-dimensions to align the content across all the images. The stabilization can include thresholds such that larger motions that are desired to be blurred by method 300 are not removed in block 304. Other stabilization techniques can also be used, such as stabilization based off of motion sensors of the camera (e.g., gyroscopes and/or accelerometers), where recorded motion data describing the motion of the camera during the capture of the images can be examined by the method to compensate for the motion by warping the images to be aligned with each other.

In block 306, the method performs one or more optical flow techniques between sets of images in the series of images. For example, the optical flow techniques can be performed between each set of images, where each set can be each adjacent set of two images in the series, in some examples. As described above, the optical flow techniques can track the motion of image content, e.g., pixels describing various objects or other image content features, among the series of images. For example, a pixel of a certain color or a group of pixels of a certain color are tracked between one image and the next image in the series of images. The "next" image or "adjacent" image in the series (e.g., for determining optical flow as described below) can be the following captured image in the series of images (e.g., captured at the next closest time). In other implementations, the adjacent image can be the most recent previous image in the series (e.g., where optical flow for each original image is determined based on its previous image). In some implementations, each pixel of each image can be tracked in the magnitude of its movement (e.g., movement amount or distance in number of pixel positions across the image) and in the direction of its movement, from the image to the adjacent image in the series of images. In other implementations, larger groups or blocks of pixels can be tracked based on optical flow. For example, the resolution of the images can be reduced and the pixels of the downsampled images can be tracked.

In block 308, the method determines vector fields for the images based on the optical flow of image content determined in block 306. For example, each image in the series of images can be assigned a vector field that includes a vector at each pixel position of the image. Each vector of the vector field indicates a direction of motion of the associated pixel from the current image to the adjacent image, and also indicates a magnitude of that motion. Each image can be provided with a vector field based on the motion of its pixels relative to the adjacent image in the series of images. The vector fields can be associated with their images, e.g., as metadata or otherwise stored in association with their images. For example, in some implementations of optical flow techniques, the method can examine whether a pixel has moved in the adjacent image within a predetermined distance (e.g., in pixels) from (or window around) its original position in the current image, and if the pixel has not moved within the predetermined distance, its movement is disregarded. In some implementations, the vector field can indicate a direction of motion of the associated pixel to the current image from the adjacent image.

In block 310, the method temporally filters the vector fields determined in block 308 to make the vector fields of the images similar to each other. This block can remove any high frequency noise or jitter that may exist in the motion across different images captured by the vector fields, so that mainly larger motion along predictable paths is shown by the vectors in the vector fields. The temporal filtering can be accomplished using any of a variety of techniques. For example, the method can take the mean or average of all the vectors in a particular pixel position over the series of images, for each pixel position (e.g., average the vectors at a pixel position over time, since the images were captured over time). This results in an averaged vector at each pixel position of the images. In effect, the averaging is a type of low pass filtering that removes high frequency components from the vector fields. In other implementations, other techniques can be used. For example, the method can take the median vector of the vectors at a pixel position over time, for each pixel position. Taking the median value removes the outliers from the vectors at each pixel position. In another example, other techniques can be used. For example, various types of smoothing techniques can be used such as a Gaussian filter, Kallman filter, blurring operation, and/or other low pass filter.

The result of the temporal filtering of block 310 is a single filtered vector field (e.g., flow field) including the combined vectors describing movement of image content over all the images in the series of images. In other implementations, block 310 can produce multiple filtered vector fields, each filtered vector field describing movement over a different subset of the original images. For example, block 310 can produce a filtered vector field for each pair of adjacent original images in the series of images. For example, a filtered vector field for the first and second original images in the series of images can be a filtered result (e.g., average or other low pass filter) of just those two original images. Another filtered vector field can be similarly determined for the second and third images, another filtered vector field for the third and fourth images, etc.

In block 312, the method spatially carves or delineates the filtered vector field(s) resulting from block 310 into one or more regions of vectors having similar direction and magnitude. This can be accomplished with any of a variety of techniques. For example, graph cut optimization can be used, in which a max-flow/min-cut optimization or other energy minimization function grows regions of vectors to encompass other vectors that are similar to vectors already in the regions. The function does not gather vectors into the region past boundaries that are established as requiring too much energy, where the boundaries are defined as a dissimilarity in the magnitude and/or direction of the vectors in the region compared to the vectors just outside the region. For example, the regions can be as large as possible with the least cost associated with them, according to the max-flow/min-cut optimization. In another example, a simpler technique can be used to carve the regions. For example, the method can compare a pixel in the region to surrounding pixels, and include any surrounding pixels into the region in which the difference in magnitude and difference in direction is less than predetermined thresholds. As the region grows, the comparisons to surrounding pixels can be repeated until the region's growth has stopped and the region has established boundaries. The result of block 312 is one or more contiguous regions covering all the pixel positions of the filtered vector field (e.g., and covering all the pixel positions of the original images). In implementations in which multiple vector fields result from block 312, the method can carve such regions in each of the filtered vector fields.

In block 313, the method selects an original image to blur. In some implementations, any of the original images can be selected. In some implementations, a single original image is blurred in the blocks described below, and the method can select any original image in some implementations, or can select a particular original image in other implementations, e.g., an image in the middle of the series of original images, an image at a beginning or end of the series, etc.

In block 314, the method selects one of the regions of the filtered vector field. In implementations in which multiple filtered vector fields were produced in block 310, the method uses the associated filtered vector field that was produced from the selected original image. In other implementations, a single filtered vector field produced from all the original images can be used for any selected original image.

In block 316, the method checks whether the selected region has a vector magnitude that is greater than a predetermined threshold. This predetermined threshold can be determined previously by manual tuning and/or experiment to find regions having motion that is to cause blurring in the original image, but not to include regions that have too little motion which would cause an unrealistic blurring effect in the original image simulating a long-exposure image.

If the vector field region has a vector magnitude less than the threshold, then the method considers the motion of pixels corresponding to that region to be too slow to be blurred, and the method continues to block 320, described below. If the vector field region has a vector magnitude greater than the threshold, then in block 318 the method performs a spatially-varying blur in a region of the selected original image corresponding to the pixel positions of the selected vector field region. The blur is based on the magnitude and the direction of the vector at each pixel in the selected region. The blur performed on a pixel varies based on the amount of detected motion at that pixel and the direction of the motion of that pixel, as indicated by the vector at that pixel. For example, the blur can use convolution to blur a subject pixel by averaging the pixel values around the subject pixel.

In some examples, the radii and amount of the blur at each pixel can be driven by the magnitude of the vector at that pixel and the direction of that vector. For example, the kernel used to perform the blur operation for a subject pixel can be made anisotropic or asymmetric along or about an axis parallel to the direction of the vector at the subject pixel. In some examples, this asymmetry can cause the weights of the blur kernel approximately in the direction of the vector to be made higher than weights of the kernel that are approximately not in the direction of the vector. For example, the lowest weights can be provided in kernel positions that are in the directions perpendicular to the vector direction, and slightly higher (but still low) weights can be provided in the other kernel positions that are not in the direction of the vector. Normal weights (or higher weights) can be provided in kernel positions in the direction of the vector. In one example, if the direction of the vector is up and to the right from the subject pixel, then kernel positions in that direction (e.g., kernel positions up and right in the line of the vector) can be assigned the highest weight (e.g., 5), kernel positions approximately perpendicular or to the sides of this vector (e.g., kernel positions up and left, and positions right and down from the center subject pixel) can be assigned the lowest weight (e.g., 0 or 1), and other kernel positions can be assigned a low value (e.g., 2). This has the effect of biasing the subject pixel to a value that is based more on the pixels in the direction of motion of that pixel as indicated by its vector.

In addition, the size of the blur kernel can be variable and based on the magnitude of the vector at the subject pixel. For example, if the magnitude is higher, the kernel can be made wider (e.g., a larger radius kernel having more pixel positions), and if the magnitude is lower, the kernel can be made smaller (e.g., smaller radius kernel having less pixel positions). This has the effect of making the pixel value of the subject pixel based on a greater number of surrounding pixels if the estimated motion of the pixel value is higher, thus creating a longer or larger blur effect in the image if the motion is faster.

The blurring is performed on all the pixels of the selected original image corresponding to the selected region of the vector field, up to the established boundaries of the region. In some implementations, the boundaries are not hard boundaries, and some blurring of the original image can extend past the boundaries. For example, a gradually lesser amount of blurring can be performed at a predetermined number of pixels of the original image before reaching the boundaries and/or a predetermined number of pixels into an adjacent region of the vector field after reaching the boundaries.

After block 318, or if the vector magnitude is less than the threshold in block 316, the method continues to block 320, in which the method checks whether there are one or more regions of the filtered vector field that have not yet been selected for processing. If so, the method returns to block 314 to select another region. If there are no further regions to select in block 320, e.g., all the regions have been processed, then the method continues to block 322.

In block 322, the method can check whether another original image is to be blurred. For example, in some implementations, the method can perform the blurring of blocks 314-320 for one of the original images. In other implementations, the method can perform the blurring of blocks 314-320 for each of multiple original images, e.g., for a subset of all or some of the original images used in the method 300. In one example, some implementations can perform the blurring for one original image if the number of original images is small, e.g., two or three images, and can perform the blurring for each image (or a subset of multiple images) if the number of original images is greater, e.g., four or more original images. Other implementations can blur only one original image regardless of the number of original images. Thus, in block 322 if there are any original images still to be blurred, then the method returns to block 313 to select another original image to blur. If there are no further original images to blur, the method continues to block 324.

In block 324, the method composites the multiple blurred images together, if such multiple blurred images have been created in the previous blocks. For example, if each original image has been blurred in blocks 313-322, then all of the blurred images are composited together. The compositing can be alpha blending or alpha compositing, a different form of blending, etc. The compositing can be any suitable type of blending or similar effect, e.g., alpha blending or alpha compositing between the pixel values of the blurred images (e.g., blurring two of the blurred images, blurring the result of that blend with another blurred image, and so on).

In block 326, the method composites the resulting blurred image onto an original image of the series of images. The resulting blurred image can be the composited blurred image resulting from block 324 (if block 324 was performed), or can be a blurred image resulting from blocks 314-320. In some implementations, the method can composite the blurred regions of the blurred image onto the original image. The method can select any of the original images as the target of compositing with the resulting blurred image, e.g., the first of the series of images, or a different one of the original images. In some implementations, the method can select the last original image in the series, or can select the last image in the series that includes one or more vectors in its vector field that were of sufficiently high magnitude to form a field region that caused blurring as described above.

In other implementations, the method can composite the original images together and composite the resulting blurred image with the resulting composited original image. The compositing can be any suitable type of blending or similar effect, e.g., alpha blending between the pixel values of the resulting blurred image and the pixel values of the selected original image. In some implementations, the alpha blending or other compositing causes the edges of the blurred regions to be feathered or otherwise mixed with the original image to blend these edges and reduce any hard region lines in the composited image. The final composited image is a resulting output image having a simulated long-exposure effect in which moving objects or other features of the image are blurred in the direction or path of motion evidenced by the series of original images.

In other implementations, the method can omit block 324, and in block 326 the method can composite each blurred image with its corresponding original image from which it derived. The resulting composited images can then be composited together to obtain the final output image, e.g., similar in technique to compositing the blurred images in block 324.

In some implementations, one or more of the above blocks can be performed in a more approximate manner that can be faster to process and/or use less resources of the system implementing the method. For example, the images can be downsampled to lower resolution to perform less vector determination and faster region determination. Results found in the downsampled images can be extrapolated to the original resolution. Alternatively, groups or blocks of pixels can be treated as single pixels in the processing of method 300. In another example, the method can skip particular blocks of method 300.

In some implementations, the method 300 can be performed in real-time while a client device is capturing original images in the series of original images. For example, the method 300 can be performed on the images that have been captured so far to determine the blurring for any appropriate moving objects or other features of the images. The processing can be performed again if additional images are captured which belong to or can be placed in the series of images. In some implementations, the more approximate form of method 300 can be performed to reduce processing time and to maintain fast response in such real-time processing.

Various blocks and operations of methods 200 and 300 can be performed in a different order than shown and/or at least partially simultaneously, where appropriate. For example, some implementations can perform blocks of the methods at various times and/or based on events not related to a user editing an image. In some implementations, blocks or operations of methods 200 and 300 can occur multiple times, in a different order, and/or at different times in the methods. In some implementations, the methods 200 and/or 300 can be implemented, for example, on a server system 102 as shown in FIG. 1. In some implementations, one or more client devices can perform one or more blocks instead of or in addition to a server system performing those blocks.

Figure 4A:
FIGS. 4A-4F are diagrammatic illustrations of examples of a series of images that can be processed by one or more features described herein.
Figure 4B:
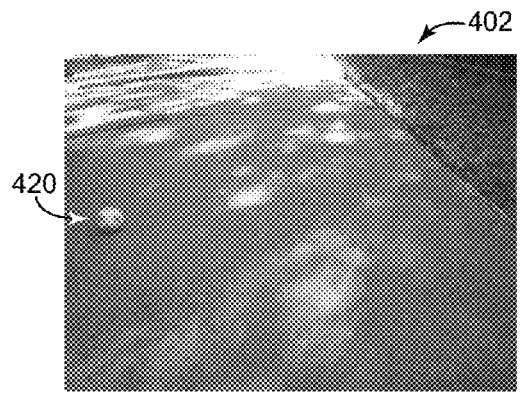
Figure 4C:
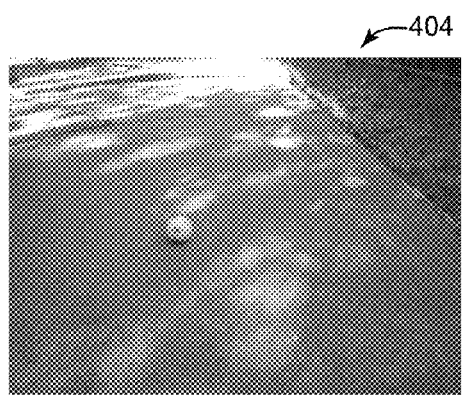
Figure 4D:
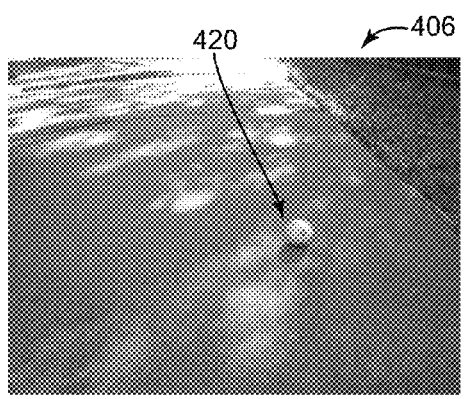
Figure 4E:
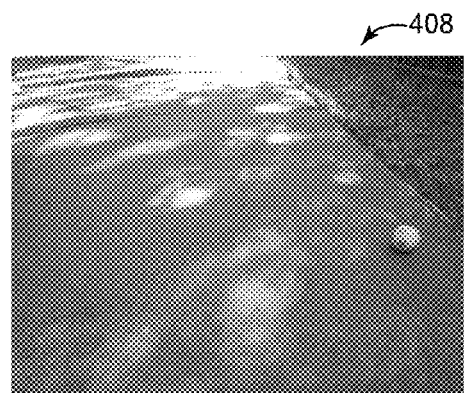
Figure 4F:
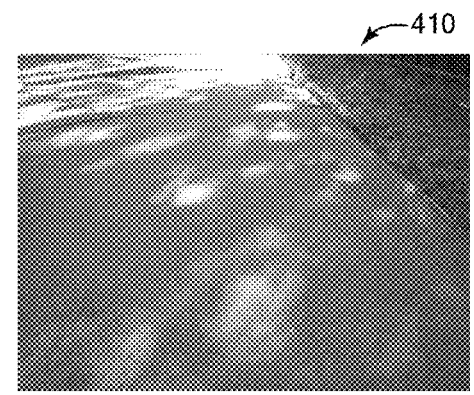

FIGS. 4A-4F are diagrammatic illustrations of examples of a series of images which can be processed by one or more features described herein. For example, image 400 of FIG. 4A, image 402 of FIG. 4B, image 404 of FIG. 4C, image 406 of FIG. 4D, image 408 of FIG. 4E, and image 410 of FIG. 4F are a series of original images that have been selected for processing to create a long-exposure image. The images can be found, received, or otherwise obtained by method 200 or 300 as described above. In some implementations, the original images can be displayed on a display device, e.g., of a client device 120, 122, 124, and/or 126 of FIG. 1, or a server system 102 in some implementations.

In the example of FIGS. 4A-4F, the series of images 400-410 were captured by a camera sequentially with an approximately constant time interval between the images. This interval can be logged or recorded by the system and if it does not qualify under predetermined requirements for the processing, then the images 400-410 are not processed. For example, if the time interval is too great between two or more sets of adjacent images, then the system may determine to not process the images. If the images qualify under the predetermined requirements, the system processes the images to create a long-exposure image. This processing can occur on the image-capturing device, on a different or receiving client device, and/or on a server device. The blurred long-exposure image resulting from the processing can be sent to and/or displayed at one or more client devices and/or server devices. In other implementations, the user can select the images 400-410 for processing. In some implementations, the system or user selects images 402-408 and excludes images 400 and 410 as not depicting a recognized main subject of the image, e.g., ball 420. For example, the system can use known object recognition or detection techniques to identify a main subject of an image, e.g., by comparing regions in the image to reference images or models.

In the processing of the images, the images can be stabilized in some implementations so that the content (e.g., depicted visual features) of all the selected images are approximately aligned vertically and horizontally (not shown in FIGS. 4A-4F). This stabilization removes undesired movement of the camera that is exhibited in the images.

The example images 400-410 depict a ball 420 in motion across a ground surface. Optical flow techniques (and/or other techniques) used by the system can detect the motion of the ball 420 by determining which pixels (e.g., having the ball's colors) have moved between each pair of adjacent images. Some implementations can create a vector field for each image based on the motion of the pixels in the associated image relative to an adjacent image. In this example, the vector field for each image can show a large magnitude vector for each pixel of the ball 420, in the direction of ball movement between the image and an adjacent image.

The vector fields can be temporally filtered in some implementations to remove high-frequency noise in the vector fields, e.g., remove jittery, undesired movements for blurring. For example, the vectors in corresponding pixel positions across the series of images can be averaged or otherwise low-pass filtered. In some implementations, for example, the movement of shadows such as shown in FIGS. 4A-4F may be present in the images caused from such factors as wind, e.g., wind moving tree leaves in the path of sunlight. Such movements may be small enough and randomly-directed enough to be removed by the temporal filters, while the larger motion of the ball would not be filtered. In some implementations, the filtering is performed across the vector fields of all the images and results in a single filtered vector field that combines the high-magnitude ball vectors from each image. For example, the filtered vector field can show large magnitude vectors pointing in a right direction for the pixels of the ball 420, where these vectors are contributed from each adjacent pair of the original images. This causes a large magnitude vectors to be positioned in the filtered vector field along the path of the ball defined in the series of the original images.

In some implementations, such as for the output example of FIGS. 5A and 5B below, the filtering is performed individually for each adjacent pair (or other subset) of images in the series, resulting in multiple filtered vector fields. For example, each filtered vector field can be created from both of the vector fields of its contributing pair of images (e.g., if there are N images, then the system creates N−1 filtered vector fields). In one example, a filtered vector field can be created from images 402 and 404 as an average or other low-pass filtered result of the vector fields of these two images, another filtered vector field can be similarly created from images 404 and 406, another from images 406 and 408, etc.

The system can carve regions in the filtered vector field(s) generated from the multiple original images. Similar vectors are grouped together in each region. In this example, the region(s) corresponding to the pixels of the ball 420 includes vectors for the motion of the ball contributed from original images depicting the ball. This creates a region of vectors that point strongly along a horizontal path of the ball's motion over the original images contributing to that field. In some implementations, movement of other pixels in the contributing images may not be significant enough to divide an image into further regions outside the ball.

The system blurs regions of one or more original images that correspond to the regions of the filtered vector field(s) that have a vector magnitude that is over a predetermined threshold. In this example, the pixels of the ball 420 have a large enough magnitude to be blurred, while other pixels of the images are not blurred. In some implementations, a subset of original images can be selected (including some or all of the original images), and each original image in the selected subset is blurred as described above using the regions of the associated filtered vector field, thus providing a blurred image for each original image. The blurred images can then be composited together into a resulting blurred image. The resulting blurred image can then be composited onto one of the original images, such as image 402 or 404, such that the edges of blurred region(s) can be feathered to blend the blurred regions smoothly with the corresponding regions of the original image. The final composited image can be the output image of the system.

Figure 5A:
FIGS. 5A-5B are examples of images resulting from processing of images of FIGS. 4A-4F according to one or more features described herein.
Figure 5B:

FIGS. 5A and 5B show examples of images resulting from the process described above using the series of images shown in FIGS. 4A-4F. In FIG. 5A, an example of a resulting blurred image 500 is shown, in which individual blurred images have been created using the regions of vector fields derived from images 400-410, and the individual blurred images have been composited to form the image 500. Each individual blurred image includes a portion of the blurred pathway of the ball, such that the composited image 500 includes those portions composited together.

FIG. 5B is an example of an output image 502 resulting from compositing the resulting blurred image 500 of FIG. 5A with one of the original images shown in FIGS. 4A-4F. In this example, the blurred image 500 has been composited with the original image 408 of FIG. 4E, such that the ball 420 in the position of FIG. 4E appears in output image 502. The blurred regions show the movement of the ball to its shown position and simulate the appearance of this movement in an image captured by a camera over a long exposure time. For example, the system can select image 408 as the last image in the series that depicts one or more objects having movement causing blurring, e.g., ball 420 in this example. In other implementations, a different original image can be composited with the blurred image 500 to produce an output image having the image of the ball 420 in a different position along its path. In still other implementations, the original images 400-410 can be composited together and the result composited with the blurred image 500, to produce an output image having the four depictions of the ball shown along the path and corresponding to the ball positions in the original images.

In some implementations, images 400 and 410 may result in having no effect or small effect on the blur determination of the movement of ball 420 described above, since images 400 and 410 do not depict ball 420 and so optical flow vectors for the ball motion are not determined for these images. Some implementations of the methods described herein can ignore or discard images 400 and 410 after determining that these images are at the beginning and/or end of the series of images and that no vectors having the threshold magnitude for blurring are present in these images. In other implementations, the system can examine images in the series in which a moving object (or other feature) does not appear, such as images 400 and 410 at the beginning and/or the end of the series, and can assume that the object is positioned outside the image on the same path and at about the same distance from the position in the adjacent image as in the next adjacent set of images. For example, the system can assume that the ball started outside the left side of the first image 400 (which has no ball depicted) at a distance and on the same path approximately corresponding to the path shown between image 402 and image 404. Similarly, the system can assume that the ball moved from the position shown in image 408 to exit the right side of image 410 (which has no ball depicted) at a distance and on the same path approximately corresponding to the path shown between image 406 and image 408. The system can place the object at these approximated positions (e.g., by using one of the depictions of the object in the series of original images) and determine blurring effects on the pixels between the approximated positions and the next (or previous) shown position of the object, using similar methods as described above. For example, a vector field can be determined between the ball 420 in image 402 and the approximated position of the ball before image 402 (assuming a constant time interval between images), such that blurring can be performed in the portions of image 402 between the ball 420 and the left edge of image 402 according to the vector field. Using such approximations, the system can, for example, extend the blur effect to the left and right edges of the output image 502 even though the position of the ball starts/ends outside the border of the image.

Figure 6:
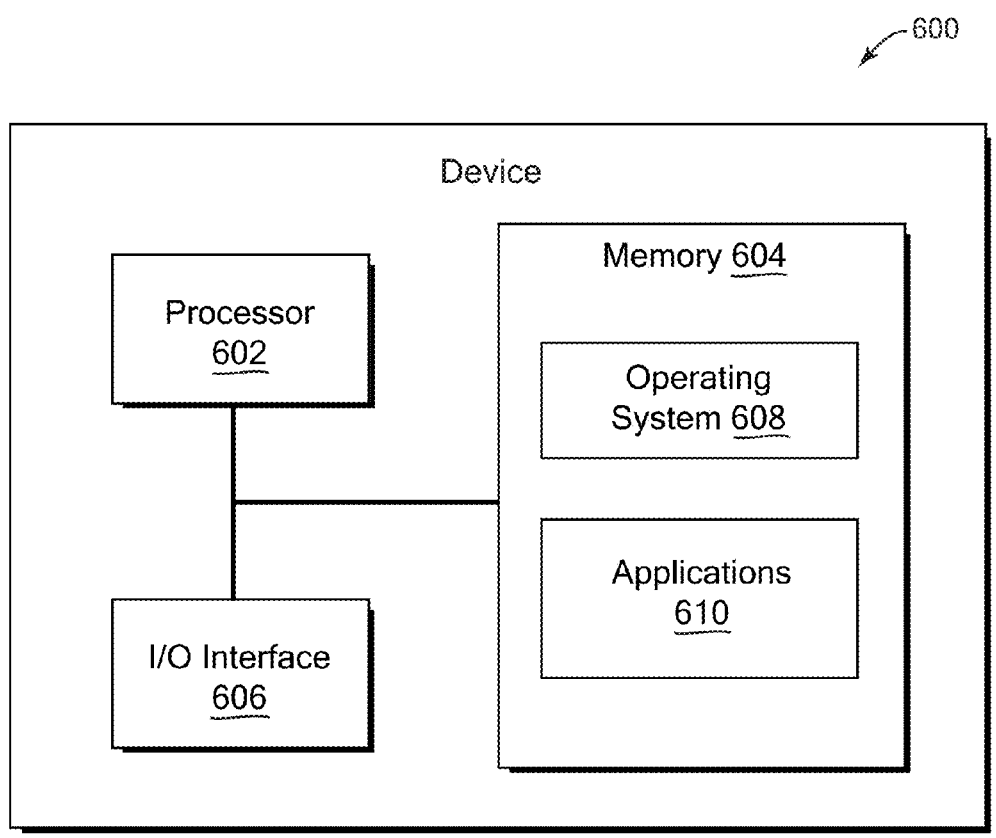
FIG. 6 is a block diagram of an example device which may be used for one or more implementations described herein.

FIG. 6 is a block diagram of an example device 600 which may be used to implement one or more features described herein. In one example, device 600 may be used to implement server device 104 of FIG. 1, and perform appropriate method implementations described herein. Device 600 can be any suitable computer system, server, or other electronic or hardware device. For example, the device 600 can be a mainframe computer, desktop computer, workstation, portable computer, or electronic device (portable device, cell phone, smart phone, tablet computer, television, TV set top box, personal digital assistant (PDA), media player, game device, wearable device, etc.). In some implementations, device 600 includes a processor 602, a memory 604, and input/output (I/O) interface 606.

Processor 602 can be one or more processors or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the device 600 by the processor 602, including an operating system 608 and one or more applications engines 610 such as a graphics editing engine, web hosting engine, social networking engine, etc. In some implementations, the applications engines 610 can include instructions that enable processor 602 to perform the functions described herein, e.g., some or all of the methods of FIGS. 2-3. Any of software in memory 604 can alternatively be stored on any other suitable storage location or computer-readable medium. In addition, memory 604 (and/or other connected storage device(s)) can store images, processes for modifying the images, parameters, and other instructions and/or data used in the features described herein. Memory 604 and any other type of storage (magnetic disk, optical disk, magnetic tape, or other tangible media) can be considered "storage devices."

I/O interface 606 can provide functions to enable interfacing the device 600 with other systems and devices. For example, network communication devices, storage devices such as memory and/or database 106, and input/output devices can communicate via interface 606. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 600, such as processor(s) 602, memory 604, and I/O interface 606. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the images and other data as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
 causing capture of a series of images of a scene, wherein causing the capture of the series of images comprises:
  in response to one or more images being captured based on input from a user, determining whether an image feature is moving within the scene; and
  in response to determining that the image feature is moving within the scene, automatically causing capture of one or more additional images of the series of images;
 examining the series of images;
 determining an optical flow of pixel features between at least one image of the series of images and an adjacent image in the series of images, wherein determining the optical flow includes determining one or more vector fields for the at least one image indicating the optical flow; and
 blurring one or more regions in the at least one image, wherein the one or more regions are spatially defined based on one or more attributes of the optical flow.

2. The method of claim 1 further comprising aligning pixel features among the series of images.

3. The method of claim 1 wherein the blurring is a spatially-varying blur using one or more kernels having respective kernel sizes and kernel value distributions based on a magnitude and a direction of vectors in the one or more vector fields of the one or more regions, and wherein the one or more kernels have a plurality of weights that are asymmetric in the one or more kernels based on one or more of the vectors.

4. The method of claim 3 wherein each of the vectors is located in correspondence with an associated pixel, wherein each vector indicates the direction and magnitude of the optical flow of the associated pixel occurring between the image in which the vector is located and the adjacent image.

5. The method of claim 3 wherein the one or more regions are spatially defined by grouping multiple vectors of the one or more vector fields, wherein the multiple vectors are grouped based on direction and magnitude of the multiple vectors.

6. The method of claim 3 wherein the blurring includes blurring the one or more regions that have vectors with a magnitude higher than a particular threshold.

7. The method of claim 6 further comprising:
 determining whether the vectors with the magnitude higher than the particular threshold are present in one or more particular images provided at one or more of: a beginning and an end of the series of images; and
 in response to determining an absence of the vectors with the magnitude higher than the particular threshold in the one or more particular images, extending a blur to the one or more particular images from one or more adjacent images that are adjacent to the one or more particular images in the series of images, wherein the one or more adjacent images include at least one of the one or more regions.

8. The method of claim 1 wherein causing the capture of the series of images further comprises:
 determining whether the series of images includes a particular number of images; and
 in response to determining that the series of images includes the particular number of images, ceasing the capture of the one or more additional images.

9. The method of claim 1 further comprising filtering the one or more vector fields to remove high-frequency differences between corresponding vectors of different images, wherein the regions are spatially defined based on one or more filtered vector fields resulting from the filtering, wherein the filtering includes one of:
 smoothing a vector at each pixel position of the different images based on vectors from two or more adjacent images in the series of images, and
 selecting a median vector of the vectors at each pixel position from the two or more adjacent images in the series of images.

10. The method of claim 1 wherein the one or more regions are determined using a graph cut technique.

11. The method of claim 1 further comprising compositing the one or more blurred regions onto at least one image of the series of images to create an image having the one or more blurred regions.

12. The method of claim 11 wherein the blurring one or more regions includes creating a blurred image and wherein the compositing includes compositing the blurred image with at least one of the series of images to create the image having the one or more blurred regions.

13. The method of claim 1 wherein an application on a client device automatically captures the series of images and provides the series of images to a processor at the client device or a connected remote server device to perform the determining the optical flow and blurring the one or more regions.

14. The method of claim 1 wherein causing the capture of the series of images further comprises:
   determining whether the image feature is not detected in the scene; and
   in response to determining that the image feature is not detected in the scene, ceasing the capture of the one or more additional images.

15. A system comprising:
   a storage device; and
   at least one processor accessing the storage device and operative to perform operations comprising:
   examining a series of images;
   determining an optical flow of pixel features in the series of images, wherein the operation of determining the optical flow includes determining one or more vector fields for a plurality of images of the series of images indicating the optical flow; and
   blurring corresponding one or more regions in one or more of the plurality of images, wherein the one or more regions have vectors with a magnitude higher than a particular threshold, wherein blurring the one or more regions includes:
      determining whether the vectors with the magnitude higher than the particular threshold are present in one or more particular images provided at one or more of: a beginning and an end of the series of images; and
      in response to determining the absence of the vectors with the magnitude higher than the particular threshold in the one or more particular images, extending a blur to the one or more particular images from one or more adjacent images that are adjacent to the one or more particular images in the series of images, wherein the one or more adjacent images include at least one of the one or more corresponding regions.

16. The system of claim 15 wherein the one or more regions are spatially defined based on one or more attributes of the optical flow, wherein the blurring is a spatially-varying blur using one or more kernels having respective kernel sizes and kernel value distributions based on a magnitude and a direction of vectors in the one or more vector fields of the one or more regions, and wherein the one or more kernels have a plurality of weights that are asymmetric in the one or more kernels based on one or more of the vectors.

17. The system of claim 15 further comprising compositing the one or more blurred regions and the one or more particular images to create an output image.

18. The system of claim 15 wherein the operations further comprise:
   causing capture of the series of images of a scene, wherein causing the capture of the series of images comprises:
      in response to one or more images of the series of images being captured based on input from a user, determining whether an image feature is moving within the scene; and
      in response to determining that the image feature is moving within the scene, automatically causing capture of one or more additional images of the series of images.

19. A non-transitory computer readable medium having stored thereon software instructions that, when executed by a processor, cause the processor to perform operations including:
   causing capture of a series of images of a scene, wherein causing the capture of the series of images comprises:
      in response to one or more images being captured based on input from a user, determining whether an image feature is moving within the scene; and
      in response to determining that the image feature is moving within the scene, automatically causing capture of one or more additional images of the series of images;
   examining the series of images;
   determining an optical flow of pixel features between at least one image of the series of images and an adjacent image in the series of images, wherein determining the optical flow includes determining one or more vector fields indicating the optical flow; and
   blurring one or more regions in the at least one image, wherein the one or more regions are spatially defined based on one or more attributes of the optical flow.

20. The non-transitory computer readable medium of claim 19, with further software instructions stored thereon that cause the processor to perform operations including:
   aligning the pixel features among the series of images.

* * * * *